United States Patent Office 3,165,483
Patented Jan. 12, 1965

3,165,483
SKELETAL POLYURETHANE FOAM AND
METHOD OF MAKING SAME
Paul G. Gemeinhardt, Sistersville, W. Va., and Stanley A.
Bingham, Pittsburgh, Pa., assignors to Mobay Chemical Company, Pittsburgh, Pa., a corporation of
Delaware
No Drawing. Filed Feb. 23, 1961, Ser. No. 90,907
11 Claims. (Cl. 260—2.5)

This invention relates to polyurethane plastics and more particularly to skeletal cellular polyurethane plastics.

The cellular polyurethane plastics heretofore available are generally speaking, of three types, (1) those having closed cells, (2) those having open cells, and (3) those having only the skeleton of the original structure. The so-called closed-cell cellular polyurethane has very few of its cells ruptured. The so-called open-cell cellular polyurethane has most of its cells ruptured and most of the filmy cell faces are still present. Skeletal cellular polyurethanes have had the filmy cell faces almost completely removed, leaving only the skeleton of the original cellular structure.

The preparation of the skeletal type of cellular polyurethane is the subject of Belgian Patent 543,362 but involves the expensive method of post-treating the cellular polyurethane to remove from 10 percent to 50 percent by weight of the original product.

A method of preparing a foamed polyurethane filter is proposed in U.S. Patent 2,961,710 but this method also involves expensive post-treatment of the already prepared cellular polyurethane by mechanically agitating the foam to open the cells and then flushing with oil to remove the particles.

Skeletal cellular polyurethane plastics have been slow in achieving commercial success because of this waste of materials involved in producing the skeletal structure and mainly because of the expense of the added processing steps. There have been no formulations available heretofore for the direct production of the skeletal structure without post-treatment.

It is, therefore an object of this invention to provide an improved method of making skeletal cellular polyurethane plastics which does not waste material or require expensive post-treatment. Another object of this invention is to provide additives which will promote the formation of skeletal cellular polyurethane plastics suitable for use as a filter. Still another object of this invention is to provide a novel method of removing the cell faces and forming heavy ribs or stalks without collapse of the cellular structure in the preparation of polyurethane foam. Another object of this invention is to provide improved skeletal cellular polyurethane plastics.

The foregoing objects and others which will become apparent from the following description are accomplished in accordance with the invention, generally speaking, by providing skeletal cellular polyurethanes and a method of making skeletal cellular polyurethanes which comprises mixing an organic polyisocyanate with castor oil or a polyhydric polyalkylene ether preferably having at least three hydroxyl groups and having a molecular weight of at least about 285 in the presence of an alkyl silane oxyalkylene block copolymer, a blowing agent and about 5 to about 40 parts per hundred parts of castor oil or polyhydric polyalkylene ether of a hydrocarbon or a halogen substituted hydrocarbon having from 7 to 70 carbon atoms, an ester, an aldehyde having 4 to 18 carbon atoms and/or a ketone having 5 to 18 carbon atoms with the proviso that these additives have a boiling point of at least about 100° C. and be free from groups which are reactive with an organic polyisocyanate. Therefore, this invention contemplates an improved method for making skeletal cellular polyurethane plastics which does not waste any of the expensive raw materials which go into the product. The initial product has the skeletal structure without any subsequent treatment of the already prepared cellular polyurethane plastic to remove cell faces. The invention provides for the preparation of skeletal cellular polyurethane plastics in a simple method using chemical additives which will allow the formation of cell faces during the time of gas evolution and polymer formation so that an expanded cellular polyurethane product is formed. At the time of maximum gas evolution, the cell faces are still fluid enough to rupture and run back into the rib or stalk and consequently are essentially not present in the final product.

This phenomenon has not been completely explained but is caused by using a combination of castor oil or a polyhydric polyalkylene ether in conjunction with a hydrocarbon, halogenated hydrocarbon, ester, aldehyde and/or ketone of the type set forth above as the resin component for reaction with an organic polyisocyanate. These additives may function in this system to inhibit the formation of the polymer so that the cell faces remain fluid long enough to be drawn back into the rib or stalk of the foam structure. It was not to be expected that one could prepare a cellular product using the cell faces to form a cellular structure but which would have practically no cell faces remaining after the product had risen to its maximum height and then cured.

Any suitable hydrocarbon, halogen substituted hydrocarbon, ester, aldehyde and/or ketone may be used provided that it has a boiling point of at least about 100° C. and is free from groups which are reactive with an organic polyisocyanate. Any suitable hydrocarbon which contains from 7 to 70 carbon atoms may be used including natural products which usually occur as mixtures of hydrocarbons such as paraffin wax and petroleum containing mixtures of for example hydrocarbons having from 22 to 30 carbon atoms. The hydrocarbons may be aliphatic, aromatic, alicyclic and the like including, for example, octane, octene, octadecyne, naphthylene, cycloheptane, toluene, styrene, phenylacetylene and the like. Paraffin mineral oil is a preferred additive of the hydrocarbon type containing mixtures of hydrocarbons having from 22 to 30 carbon atoms. Any suitable halogenated hydrocarbon may be used including the specific examples set forth above which have one or more hydrogen atoms replaced by Cl, Br, F, I or the like and particularly n-octadecyl bromide, n-heptyl chloride, n-heptyl bromide, n-octadecyl fluoride, n-octadecyl iodide and the like.

Any suitable ester which does not have hydrogen atoms which are reactive with an organic polyisocyanate may be used including naturally occurring fats and waxes or the esterification products of an equivalent amount of an alcohol with an equivalent amount of a carboxylic acid based on the —OH and —COOH groups, for example, butyl acetate. Any suitable alcohol may be used such as, for example, ethyl alcohol, n-propyl alcohol, isopropyl alcohol, n-butyl alcohol, isobutyl alcohol, sec-butyl alcohol and the like including heptadecyl alcohol and the like as well as polyhydric alcohols such as ethylene glycol, propylene glycol, 1,6-hexane diol, trimethylol propane and the like. Any suitable carboxylic acid may be used such as, for example, acetic acid, pelargonic acid, stearic acid, ricinoleic acid and the like as well as polycarboxylic acids such as adipic acid, sebacic acid, terephthalic acid and the like. The fats may be the glycerol esters of fatty acids such as linseed oil, poppy oil, tung oil, sperm oil, fish oil and the like. The fatty acids preferably contain from 4 to 26 carbon atoms. A wax may be the ester such as beeswax, carnauba wax, lanolin and the like with the proviso that these substances must have all of the active hydrogen atoms which are reactive with an organic polyisocyanate blocked by reaction with a corresponding alcohol, acid or the like. Any suitable aldehyde may be used which has from 4 to 18 carbon atoms including aliphatic, aromatic, heterocyclic and alicyclic aldehydes such as, for example, n-valeraldehyde, crotonaldehyde, stearaldehyde, benzaldehyde, furfural, cyclohexyl formaldehyde and the like. Any suitable ketone may be used which contains from 5 to 18 carbon atoms including aliphatic, aromatic, alicyclic, heterocyclic and mixed aliphatic-aromatic ketones such as, for example, methyl-n-propyl ketone, stearone, phorone, benzophenone, cyclohexanone, 1,2-pyrone, ethyl phenyl ketone, hexanone-2, hexanone-3, di-n-propyl ketone and the like.

Any suitable organic polyisocyanate may be used in the process of the present invention including aromatic, aliphatic and heterocyclic polyisocyanates. In other words, two or more isocyanate radicals may be bonded to any suitable divalent or higher polyvalent organic radical to produce the organic polyisocyanates which are useful in accordance with the present invention including acyclic, alicyclic, aromatic and heterocyclic radicals. Suitable organic polyisocyanates are, therefore, ethylene diisocyanate, ethylidene diisocyanate, propylene-1,2-diisocyanate, cyclohexylene-1,2-diisocyanate, m-phenylene diisocyanate, 2,4-toluylene diisocyanate, 2,6-toluylene diisocyanate, 3,3'-dimethyl-4,4'-biphenylene diisocyanate, 3,3'-dimethoxy-4,4'-diphenylene diisocyanate, 3,3'-diphenyl-4,4'-biphenylene diisocyanate, 4,4'-biphenylene diisocyanate, 3,3'-dichloro-4,4'-biphenylene diisocyanate, p,p',p''-triphenylmethane triisocyanate, 1,5-naphthalene diisocyanate, furfurylidene diisocyanate or polyisocyanates in a blocked or inactive form such as the bis-phenyl carbamates of 2,4- or 2,6-toluylene diisocyanate, p,p'-diphenylmethane diisocyanate, p-phenylene diisocyanate, 1,5-naphthalene diisocyanate and the like. It is preferred to use the commercially available mixture of toluylene diisocyanates which contains 80 percent 2,4-toluylene diisocyanate and 20 percent 2,6-toluylene diisocyanate or 4,4'-diphenylmethane diisocyanate.

As pointed out above the resinous component to be reacted with an organic polyisocyanate may be castor oil or a polyhydric polyalkylene ether having a molecular weight of at least about 285.

Any suitable polyhydric polyalkylene ether may be used such as, for example, the condensation product of an alkylene oxide or of an alkylene oxide with a polyhydric alcohol. Any suitable polyhydric alcohol may be used such as, for example, ethylene glycol, 1,3-propylene glycol, 1,2-propylene glycol, 1,4-butylene glycol, 1,3-butylene glycol, 1,2-butylene glycol, 1,5-pentane diol, 1,4-pentane diol, 1,3-pentane diol, 1,6-hexane diol, 1,7-heptane diol, glycerine, trimethylol propane, 1,3,6-hexanetriol, triethanolamine, pentaerythritol, sorbitol and the like. Any suitable alkylene oxide may be used such as, for example, ethylene oxide, propylene oxide, butylene oxide, amylene oxide and the like. Of course, the polyhydric polyalkylene ethers can be prepared from other starting materials such as, for example, tetrahydrofuran, epihalohydrins such as, for example epichlorohydrin and the like as well as aralkylene oxides such as, for example, styrene oxide and the like. The polyhydric polyalkylene ethers may have either primary or secondary hydroxyl groups and preferably are polyhydric polyalkylene ethers prepared from alkylene oxides having from two to five carbon atoms and some trihydric or higher polyhydric alcohol such as glycerine, trimethylol propane, pentaerythritol and the like so that some branching exists in the product. In other words, polyhydric polyalkylene ethers having three or four hydroxyl groups per molecule and a molecular weight of from about 2000 to about 5000 are most preferred. The polyhydric polyalkylene ethers may be prepared by any known process such as, for example, the process disclosed by Wurtz in 1859 and in Encyclopedia of Chemical Technology, vol. 7, pp. 257–262, published by Interscience Publishers Inc. (1951), or in U.S. Patent 1,922,459.

The preferred resin is castor oil. This material is easy to work with and produces a skeletal foam particularly suited for use as a filter and having high particle retention ability.

Any suitable alkyl silane oxyalkylene block copolymer may be used. The preferred ones are disclosed in U.S. Patent 2,834,748 and have the formula:

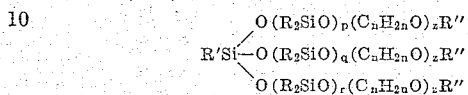

wherein R, R' and R'' are alkyl radicals having 1 to 4 carbon atoms; $p$, $q$ and $r$ each have a value of from 4 to 8 and $(C_nH_{2n}O)_z$ is a mixed polyoxyethylene oxypropylene group containing from 15 to 19 oxyethylene units and from 11 to 15 oxypropylene units with $z$ equal to from about 26 to about 34. Most preferred is a compound having the formula

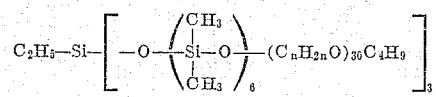

wherein $(C_nH_{2n}O)$ is a mixed polyoxyethylene and oxypropylene block copolymer containing about 17 oxyethylene units and about 13 oxypropylene units.

It is preferred to include a catalyst in the reaction mixture leading to the production of the cellular polyurethane plastics. Suitable catalysts are, for example, tertiary amines, such as, for example, triethylene diamine, N-methyl morpholine, N-ethyl morpholine, diethyl ethanolamine, N-coco morpholine, 1-methyl-4-dimethylamino ethyl piperazine, 3-methoxy-N-dimethyl propyl amine, N-dimethyl-N'-methyl isopropyl propylene diamine, N,N-diethyl-3-diethyl amino propyl amine, dimethyl benzyl amine and the like. Other suitable catalysts are for example, tin compounds such as, stannous chloride, tin salts of carboxylic acids, such as dibutyl tin di-2-ethyl hexoate, tin alcoholates such as stannous octoate, stannous oleate and the like, as well as other organo metallic compounds such as are disclosed in U.S. Patent 2,846,408 and in copending application S.N. 835,450.

The process of the invention may be carried out in a relatively straightforward and convenient manner preferably using a machine mixer such as that described in U.S. Reissue Patent 24,514. The relative amounts of the castor oil or polyhydric polyalkylene ether and the hydrocarbon, halogenated hydrocarbon, ester, aldehyde and/or ketone additive can be from about 5 to 40 parts of the additive per hundred parts of the resin. It is preferred to use sufficient organic polyisocyanate to react with all the active hydrogen in the starting materials and most preferably excess organic polyisocyanate is used. Preferably 5 to 15 parts of the hydrocarbon, halogenated hydrocarbon, ester, aldehyde or ketone are used per hundred parts of castor oil or polyhydric polyalkylene ether. A particularly preferred system is based on 100 parts castor oil, 5 to 15 parts paraffin mineral oil, 3 to 4.5 parts water, 0.2 to 1.5 parts of the alkyl silane oxyalkylene block copolymer, about 45 to 75 parts of toluylene diisocyanate, 0.2 to 1.5 parts of stannous octoate or stannous oleate and about 0.3 to 1.2 parts of triethylene diamine, the parts being by weight. The amount of toluylene diisocyanate is preferably 90 percent to 110 percent by weight of the total of 10 times the weight of water plus the weight required to react with all the active hydrogen in the formulation. The term "active hydrogen" is understood to mean hydrogen atoms which are reactive with an —NCO group.

It is possible to proceed by the so-called one-shot method or alternately, the prepolymer technique may be used wherein the organic polyisocyanate is prereacted with the castor oil or polyhydric polyalkylene ether.

It is often desirable to include other materials in the reaction mixture such as, for example, coloring agents, fillers, emulsifiers and the like. Moreover, the skeletal cellular polyurethane will cure at room temperature to attain its final properties but may be accelerated, if desired, by heating in an over at, for example, 150° F.

It is preferred to include the hydrocarbon, halogenated hydrocarbon, ester, aldehyde and/or ketone in the castor oil or polyhydric polyalkylene ether and then mix the blend with an organic polyisocyanate and a blowing agent. Water will react with the organic polyisocyanate and act as the blowing agent for the system or in the alternative one may use a blowing agent such as a halohydrocarbon for example dichlorodifluoromethane, trichlorofluoromethane, nitroso compounds such as N,N'-dinitrosopentamethylene tetramine, azo compounds such as diazoaminobenzene, 1,3-diphenyl triazene, azo dicarbonamide, 1,1'-azo-bis-formamide, 2,2'-azo-isobutyronitrile, azo-hexahydrobenzonitrite and the like.

The products of this invention have may uses but are particularly useful for the preparation of filters. For example, the skeletal polyurethane foam is useful as air filters in refrigerators, heating equipment, air conditioners and the like. The foamed polyurethane may be made into a filter by cutting it into the desired shape. Any surface skin formed during the foaming operation should be removed since this may interfere with the filtering capacity.

The invention is further illustrated by the following examples in which the parts are by weight unless otherwise indicated.

*Example 1*

About 90 parts of castor oil having an hydroxyl number of about 160 are blended with about 10 parts of paraffin mineral oil. The resulting blend is mixed with about 45 parts of a mixture of 80 percent 2,4- and 20 percent 2,6-toluylene diisocyanate, about 4.4 parts of a mixture of about 3 parts water, about 1 part of an alkyl silane oxyalkylene block copolymer having the formula

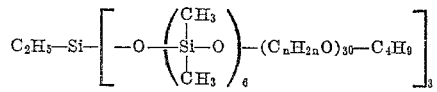

wherein ($C_nH_{2n}O$) represents about 17 oxyethylene units and about 13 oxypropylene units and about 0.4 part of triethylene diamine, and about 1.2 parts of a mixture of 1.0 part of N-ethyl morpholine and about 0.2 part stannous oleate on a machine mixer as disclosed in U.S. Reissue Patent 24,514. The mixture of reaction components from the machine is allowed to fall into a paper lined mold where it begins to foam after about 10 seconds. The foam has risen to its maximum height in about 85 seconds and has a skeletal structure. The skeletal cellular polyurethane plastic is then placed in an oven at about 150° F. for about one hour. It has practically no cell faces and is suitable for use as a filter without further chemical treatment. The skeletal polyurethane has the following physical properties:

Tensile strength _____lbs./ft.³__ 15.0
Elongation _____percent__ 75
Tear strength _____lbs./in.__ 1.5
Compression set, 6 hr. 90% _____percent__ 15

The air transmission through a ⅜ inch thickness on the "Fram" tester shows a pressure drop of less than 0.5 inch of water.

*Example 2*

About 90 parts of castor oil having an hydroxyl number of about 160 are blended with about 10 parts of naphthalene. The resulting blend is mixed with about 55 parts of a mixture of 80 percent 2,4- and 20 percent 2,6-toluylene diisocyanate, about 4.35 parts of a mixture of about 3 parts water, about 1 part of the alkyl silane oxyalkylene block copolymer of Example 1 and about 0.35 part of triethylene diamine, and about 1,2 parts of a mixture of 1 part of N-ethyl morpholine and about 0.2 part of stannous oleate on a machine mixer as disclosed in U.S. Reissue Patent 24,514. The foaming procedure is similar to that in Example 1 resulting in a skeletal cellular polyurethane plastic which has practically no cell faces and which has a density of about 2 lbs./ft.³. The skeletal cellular polyurethane plastic is suitable for use as a filter without further chemical treatment. The air transmission through a ⅜ inch thickness as measured on a "Fram" tester shows a pressure drop of less than 0.5 inch of water.

*Example 3*

About 100 parts of castor oil having an hydroxyl number of about 160 are blended with about 5 parts of toluene. The resulting blend is then mixed with the isocyanates, catalysts and emulsifiers set forth in Example 1 in the proportions given in Example 1. The resulting skeletal cellular polyurethane plastic has a density of about 2 lbs./ft.³ and is suitable for use as a filter without further chemical treatment. The air transmission as measured on a ⅜ inch thickness on a "Fram" tester shows a pressure drop of less than 0.5 inch of water.

*Example 4*

About 90 parts of a polyalkylene ether triol prepared from propylene oxides and glycerol and having a molecular weight of about 3000 and an hydroxyl number of about 56 are blended with about 10 parts of paraffin mineral oil. The resulting blend is mixed with about 48.3 parts of the toluene diisocyanates employed in Example 1, about 5.4 parts of a mixture of about 4 parts of water, about 1.2 parts of the alkyl silane oxyalkylene block copolymer employed in Example 1 and about 0.2 part of 1-methyl-4-dimethyl aminoethyl piperazine, and about 2 parts of a mixture of 1 part of stannous oleate and about 1 part of N-ethyl morpholine on a machine mixer as described in U.S. Reissue Patent 24,514. The resulting mixture is allowed to fall into a mold where the foam is formed in a short time. The resulting skeletal cellular polyurethane plastic has practically no cell faces and is suitable for use as a filter without further chemical treatment. The density of this skeletal polyurethane is about 1.4 lbs./ft.³, it has about 25 cells per linear inch and the air transmission as measured on a "Fram" tester shows a pressure drop of less than 0.5 inch of water through a ⅜ inch thickness.

*Example 5*

About 9 parts of castor oil are blended with about 10 parts of methyl propyl ketone. The resulting blend is mixed with about 53 parts of the toluylene diisocyanates employed in Example 1, about 4.4 parts of a mixture of about 3 parts of water, about 1 part of the alkyl silane oxyalkylene block copolymer employed in Example 1 and about 0.4 part of triethylene diamine and about 1.2 parts of a mixture of about 1 part of N-ethyl morpholine and about 0.2 part of stannous oleate on a machine mixer as disclosed in U.S. Reissue Patent 24,514. The resulting skeletal cellular polyurethane plastic has a density of about 2 lbs./ft.³, practically no cell faces, is suitable for use as a filter without further chemical treatment and the pressure drop across a ⅜ inch thickness is less than 0.5 inch of water.

The foregoing example is repeated except that valeraldehyde is used in place of methyl propyl ketone. A skeletal cellular polyurethane plastic having a density of about 2 lbs./ft.³ is obtained which is suitable for use as a filter without further chemical treatment. Repeating the example with sperm oil beeswax or butyl acetate gives substantially the same results.

Omission of the methyl propyl ketone, valeraldehyde, sperm oil, beeswax or butyl acetate from the examples yields a product having many cell faces which is unsuitable for use as a filter without post-treatment and which shows a pressure drop through a ⅜ inch thickness of far more than 0.5 inch of water.

The air transmission data given in the foregoing examples is the result of tests conducted on a "Fram" tester calibrated to draw 350 cubic feet of air per minute through a six inch diameter aperture. The pressure drop across a given thickness is measured in inches of water. In order to be classified as a skeletal cellular polyurethane plastic, the pressure drop across a ⅜ inch thickness of cellular polyurethane plastic must not be more than about 0.5 inch of water at an air volume of 350 ft.³ minute.

It is to be understood that the foregoing examples are for the purpose of illustration and that any other suitable polyhydric polyalkylene ether, organic polyisocyanates, hydrocarbons, halogenated hydrocarbons, esters, aldehydes, ketones, stabilizers and the like could have been used in accordance with the preceding disclosure.

Although the invention has been described in considerable detail in the foregoing, it is to be understood that such detail is solely for the purpose of illustration and that many variations can be made by those skilled in the art without departing from the spirit and scope of the invention except as set forth in the claims.

What is claimed is:

1. The method of making a skeletal cellular polyurethane plastic which comprises reacting (a) an organic polyisocyanate with (b) a member selected from the group consisting of castor oil and a polyhydric polyalkylene ether having a molecular weight of at least about 285, in the presence of a blowing agent, an alkyl silane oxyalkylene block copolymer and from about 10 to about 40 parts per hundred parts of (b) of an additive selected from the group consisting of hydrocarbons having from 7 to 70 carbon atoms, halogen substituted hydrocarbons having from 7 to 70 carbon atoms, esters of equivalent amounts of carboxylic acids and alcohols based on the —OH and —COOH groups, aldehydes having from 4 to 18 carbon atoms and ketones having from 5 to 18 carbon atoms, said additive having a boiling point of at least about 100° C. and being free of groups which are reactive with an organic polyisocyanate.

2. The skeletal cellular polyurethane plastic produced by the method of claim 1.

3. The method of making a skeletal cellular polyurethane plastic which comprises reacting (a) an organic polyisocyanate with (b) a member selected from the group consisting of castor oil and a polyhydric polyalkylene ether having a molecular weight of at least about 285 and (c) water in the presence of an alkyl silane oxyalkylene block copolymer having the formula

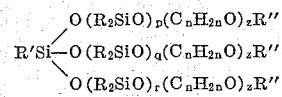

wherein R, R' and R" are alkyl radicals having 1 to 4 carbon atoms; p, q and r each have a value of from 4 to 8 and $(C_nH_{2n}O)_z$ is a mixed polyoxyethylene oxypropylene block containing from 15 to 19 oxyethylene units and from 11 to 15 oxypropylene units with z equal to from about 26 to about 34 and from about 10 to about 15 parts per hundred parts of (b), of an additive selected from the group consisting of hydrocarbons and halogen substituted hydrocarbons having from 7 to 70 carbon atoms, esters of equivalent amounts of carboxylic acids and alcohols based on the —OH and —COOH groups, aldehydes having from 4 to 18 carbon atoms and ketones having from 5 to 18 carbon atoms, said additive having a boiling point of at least about 100° C. and being free of groups which are reactive with an organic polyisocyanate.

4. The skeletal cellular polyurethane plastic produced by the method of claim 3.

5. A method of making a skeletal cellular polyurethane plastic which comprises reacting (a) an organic polyisocyanate with (b) a member selected from the group consisting of castor oil and a polyhydric polyalkylene ether having a molecular weight of at least about 285 and (c) water in the presence of an alkyl silane oxyalkylene block copolymer having the formula

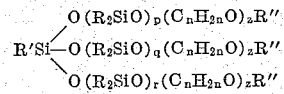

wherein R, R' and R" are alkyl radicals having 1 to 4 carbon atoms; p, q and r each have a value of from 4 to 8 and $(C_nH_{2n}O)_z$ is a mixed polyoxyethylene oxypropylene block containing from 15 to 19 oxyethylene units and from 11 to 15 oxypropylene units with z equal to from about 26 to about 34 and from about 10 to about 15 parts per hundred parts of (b), of a hydrocarbon having from 7 to 70 carbon atoms and a boiling point of at least about 100° C.

6. The method of claim 5 wherein (b) is castor oil.

7. The method of claim 5 wherein (b) is a polyhydric polyalkylene ether having a molecular weight of at least about 285 and having at least three hydroxyl groups.

8. The method of claim 5 wherein the reaction is carried out in the presence of a tin catalyst.

9. The method of claim 5 wherein the reaction is carried out in the presence of both a tin catalyst and a teritary amine catalyst.

10. A method of making a skeletal cellular polyurethane plastic which comprises reacting from about 45 to about 75 parts of toluylene diisocyanate with about 100 parts of castor oil and about 3 to about 4.5 parts of water in the presence of from about 0.2 to about 1.5 parts of an alkyl silane oxyalkylene block copolymer having the formula

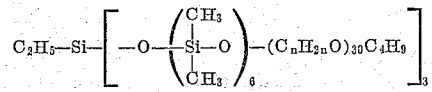

wherein $(C_nH_{2n}O)$ is a mixed polyoxyethylene and oxypropylene block copolymer containing about 17 oxyethylene units and about 13 oxypropylene units, about 0.2 to about 1.5 parts of a member selected from the group consisting of stannous octoate and stannous oleate, from about 0.3 to about 1.2 parts of triethylene diamine and from about 10 to about 15 parts of paraffin mineral oil.

11. The method of claim 10 wherein said paraffin mineral oil contains from 22 to 30 carbon atoms.

References Cited in the file of this patent

UNITED STATES PATENTS

| | | |
|---|---|---|
| 2,763,624 | Newell | Sept. 18, 1956 |
| 2,764,565 | Hoppe et al. | Sept. 25, 1956 |
| 2,933,462 | Fischer | Apr. 19, 1960 |
| 2,956,031 | Khawam | Oct. 11, 1960 |
| 2,961,710 | Stark | Nov. 29, 1960 |
| 2,962,183 | Rill et al. | Nov. 29, 1960 |
| 3,044,971 | Polis | July 17, 1962 |
| 3,067,149 | Dombrow et al. | Dec. 4, 1962 |

FOREIGN PATENTS

| | | |
|---|---|---|
| 852,379 | Great Britain | Oct. 26, 1960 |
| 1,212,252 | France | Oct. 19, 1959 |
| 1,176,044 | France | Nov. 17, 1958 |
| 519,547 | Belgium | May 15, 1953 |